Figure 1:
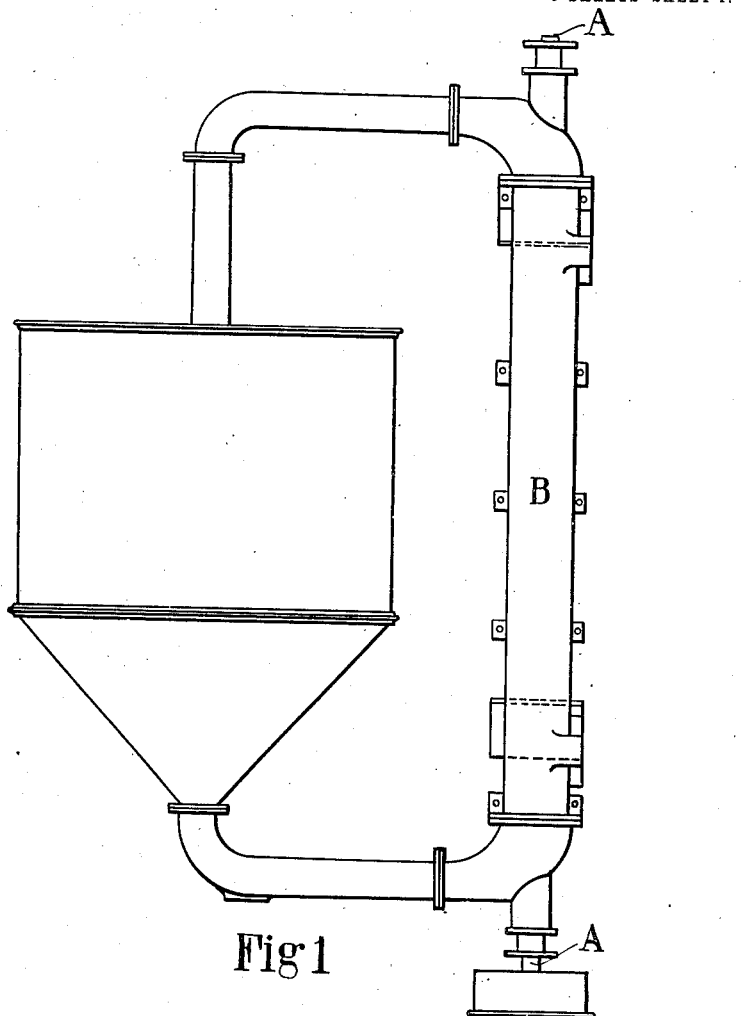

H. JACKSON.
METHOD OF PREPARING PAPER PULP.
APPLICATION FILED MAR. 13, 1911.

1,083,102.

Patented Dec. 30, 1913.

5 SHEETS—SHEET 1.

WITNESSES

INVENTOR
Harold Jackson

H. JACKSON.
METHOD OF PREPARING PAPER PULP.
APPLICATION FILED MAR. 13, 1911.

1,083,102.

Patented Dec. 30, 1913.
5 SHEETS—SHEET 2.

WITNESSES

INVENTOR
Harold Jackson

H. JACKSON.
METHOD OF PREPARING PAPER PULP.
APPLICATION FILED MAR. 13, 1911.

1,083,102.

Patented Dec. 30, 1913.
5 SHEETS—SHEET 3.

WITNESSES

INVENTOR
Harold Jackson

H. JACKSON.
METHOD OF PREPARING PAPER PULP.
APPLICATION FILED MAR. 13, 1911.

1,083,102.

Patented Dec. 30, 1913.

5 SHEETS—SHEET 4.

WITNESSES

INVENTOR
Harold Jackson

H. JACKSON.
METHOD OF PREPARING PAPER PULP.
APPLICATION FILED MAR. 13, 1911.

1,083,102.

Patented Dec. 30, 1913.

5 SHEETS—SHEET 5.

WITNESSES

INVENTOR
Harold Jackson

UNITED STATES PATENT OFFICE.

HAROLD JACKSON, OF GARSTANG, ENGLAND.

METHOD OF PREPARING PAPER-PULP.

1,083,102.  Specification of Letters Patent.  Patented Dec. 30, 1913.

Application filed March 13, 1911. Serial No. 614,165.

*To all whom it may concern:*

Be it known that I, HAROLD JACKSON, a British subject, residing at Garstang, county of Lancaster, England, have invented certain new and useful Improvements in the Method of Preparing Paper-Pulp, of which the following is a specification.

This invention relates to improvements in the process of pulping or hydrating fibers previously ground or finely divided for paper making with the object of expediting and more thoroughly effecting the hydration of the cellulose material and ultimately of obtaining a stronger paper therefrom.

In the preparation of pulp for paper making, it is customary to treat the fibers, after being broken up or finely comminuted, in a beating machine in order to saturate them or hydrate them to such a degree that they will spread out and adhere in thin sheets, the strength of such sheets depending to a large degree on the degree of hydration obtained.

In the type of beating machines in more general use a horizontal roll fitted with steel blades is rotated above a bed plate of similar construction, between which the pulp is carried again and again during its circulation through the machine and is cut by the knives. Various forms of rotating beaters have been proposed or constructed carrying vanes, knives, prongs or rubbers which revolve upon a shaft within a casing, and in these machines, the shafts and their attachments rotate in a circular path, the pulping and hydrating action being obtained by the abrasive rubbing, rolling, grinding, or tearing of the rotating part against a stationary part or parts. Other forms of machines have been proposed or constructed with a stamping or pounding action.

I find that the present methods of hydrating do not produce the strongest paper obtainable from a given fiber and also that such methods take a long time to produce the requisite degree of hydration, "wetness" or commonly misnamed "greasiness," of the pulp which is necessary to produce a paper with the greatest strength obtainable from any fiber or material. I also find that any desired degree of hydration is obtainable by subjecting the finely divided and wet pulp to a compound mechanical treatment comprising a simultaneously exerted or combined gentle hammering or tapping and a rubbing or dragging action instead of the abrading action hitherto adopted, such treatment or tapping causing the individual fibers of the pulp to absorb moisture much more rapidly and efficiently, thus securing the requisite hydration without breaking or injuring the fiber.

My invention therefore consists in the process or method of treating fibers for the preparation of paper pulp by subjecting the wet fibers or fibers suspended in water to the above described compound or combined treatment which is repeated continuously or in rapid succession.

This invention will be fully described with reference to the accompanying drawings in which a machine adapted for carrying out the invention is illustrated.

Figure 2:
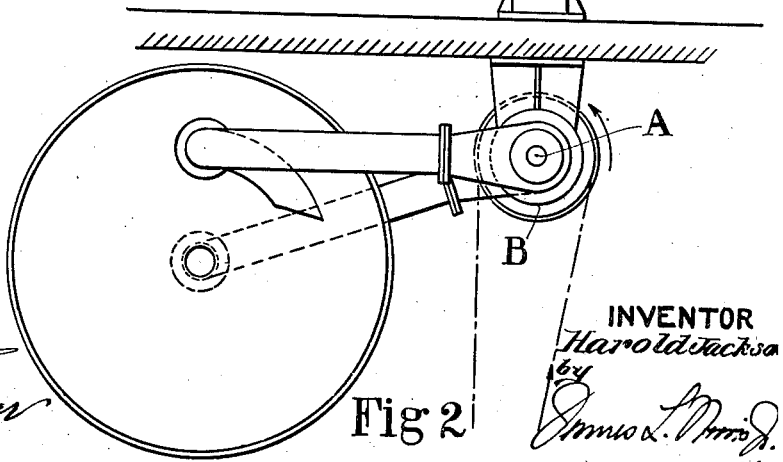
Figure 3:
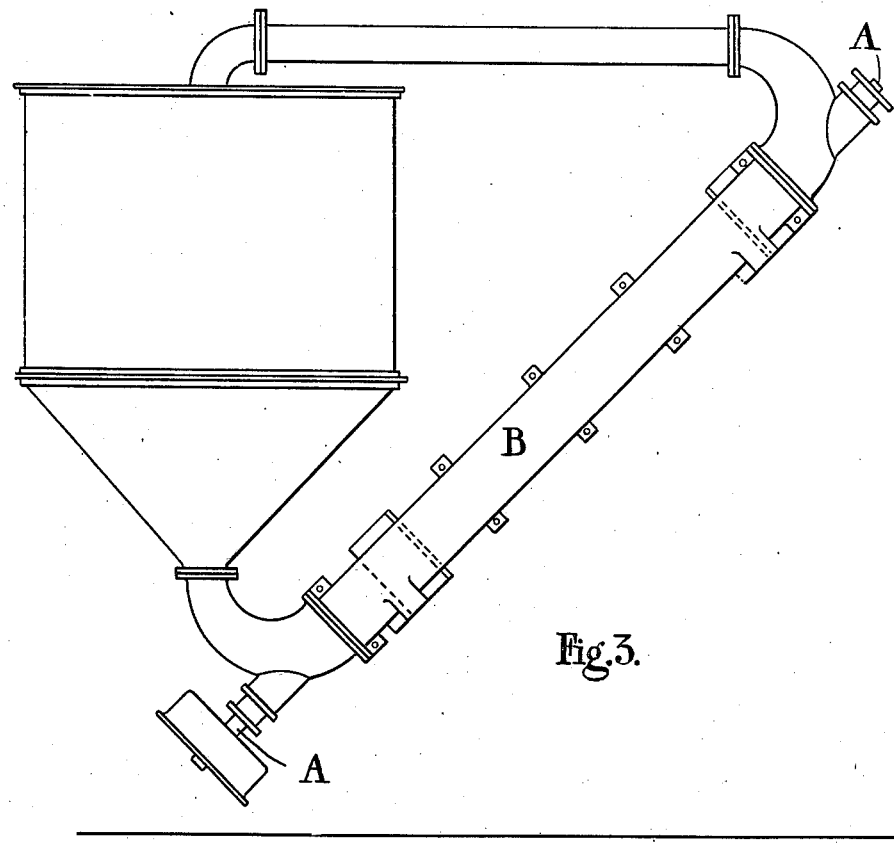
Figure 4:
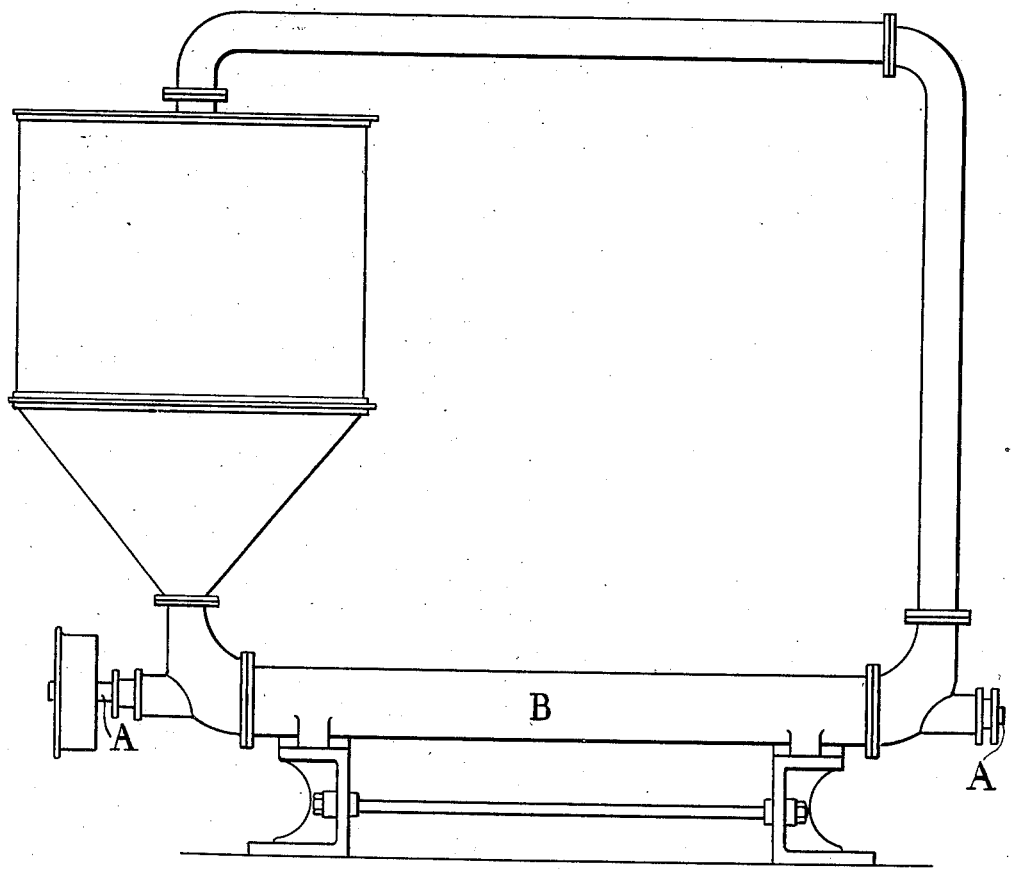
Figure 8:
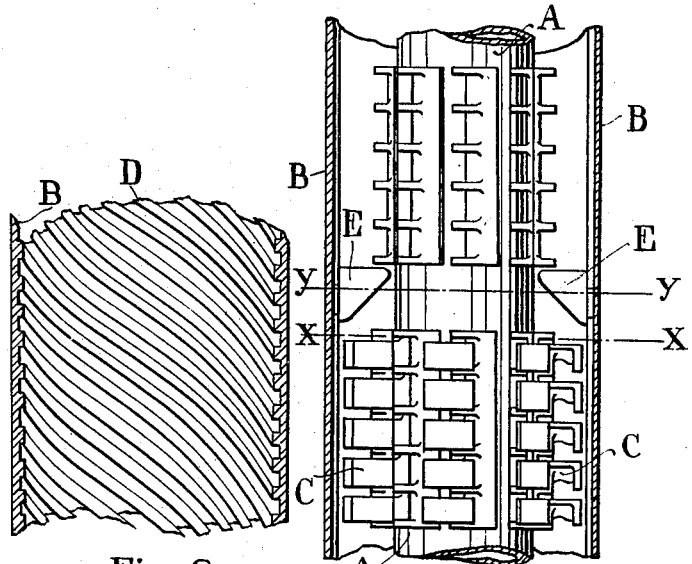
Figure 9:
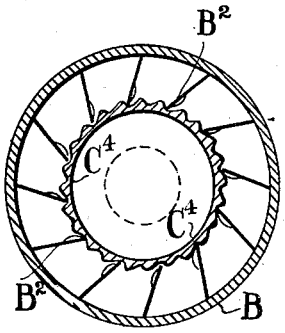
Figure 5:
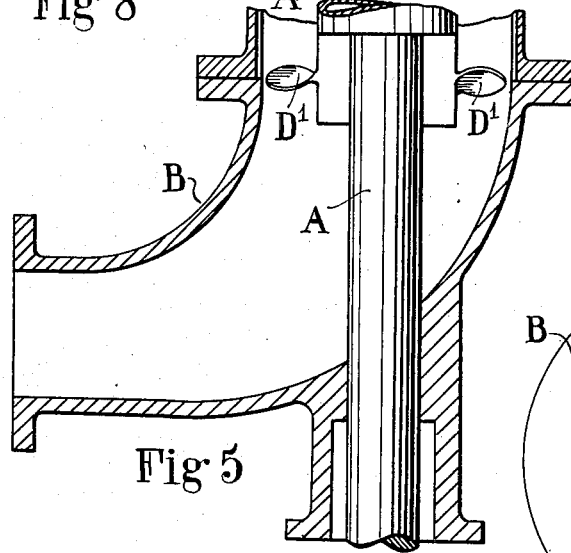
Figure 7:
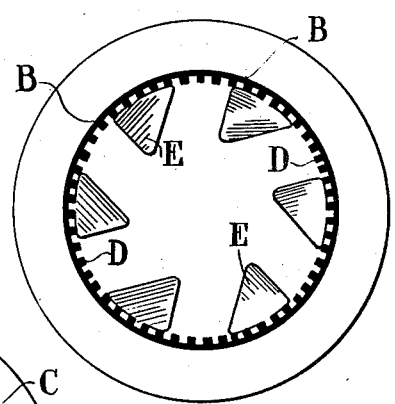
Figure 6:
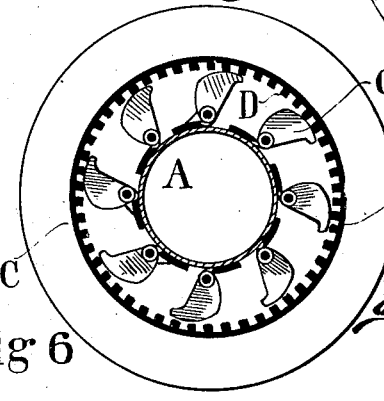
Figure 10:
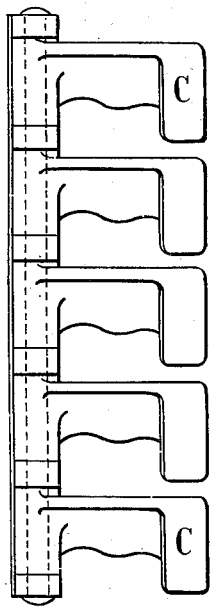
Figure 12:
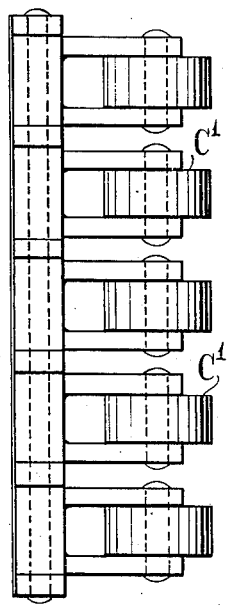
Figure 14:
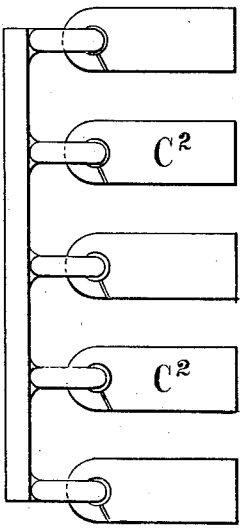
Figure 16:
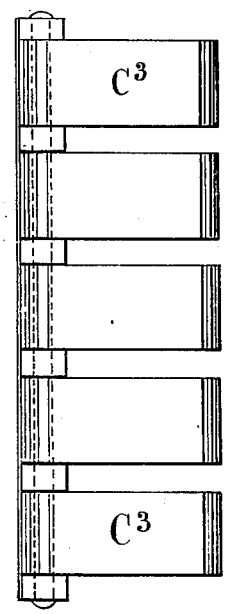
Figure 11:
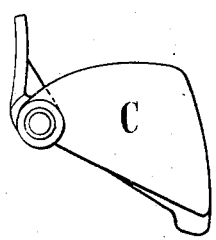
Figure 13:
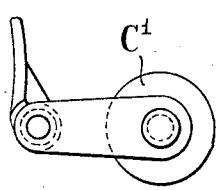
Figure 15:
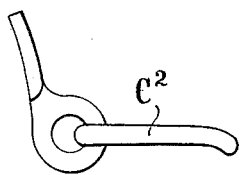
Figure 17:
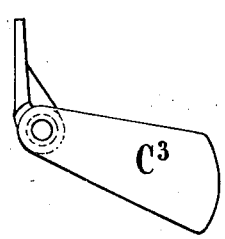

Figure 1 is a side elevation of the machine. Fig. 2 is a plan of same. Fig. 3 is a side elevation of a similar machine set inclined. Fig. 4 is a side elevation of a similar machine set horizontal. Fig. 5 is a vertical sectional elevation of part of the machine. Fig. 6 is a transverse sectional plan on line $x$—$x$ Fig. 5. Fig. 7 is a transverse sectional plan on line $y$—$y$ Fig. 5. Fig. 8 is a sectional elevation showing spiral ribs. Fig. 9 is a transverse sectional plan showing a modified construction. Figs. 10 and 11 are elevation and plan respectively of one form of the beater. Figs. 12 to 17 show other forms of beater.

In carrying out the invention I employ a machine with a rotor A arranged in a case B, the rotor being fitted with a number of beaters C pivoted thereto, and the interior of the case B constructed with internal projections D in the path of the beaters, against which projections the beaters operate with a combined gentle vibratory tapping or hammering and a rubbing or dragging action as they revolve. The aforementioned projections are preferably formed by fluting the interior of the case as shown in Figs. 6 and 7, and such fluting may be spiral as in the case B′ in Fig. 8. The beaters C are preferably in the form of blades pivoted to brackets $c$ bolted to the rotor shaft A as in Figs. 5, 10 and 11 or in the form of rollers C″ as in Figs. 12 and 13, or in the form of pivoted links or blades C², as in Figs. 14 and 15, or pivoted blocks C³, as in Figs. 16 and 17.

In the arrangement shown in Fig. 9, the rotor C⁴ is corrugated or fluted, and flexible spring beaters are attached to the case B². The rotor may be fitted with a screw propeller D' which forces the pulp upward and the casing B is fitted at intervals with inclined vanes or blades E which also raise the pulp as it is carried around by the beaters. The mixed fiber and water forming the pulp is caused to circulate by the screw propeller D' or by a rotary pump through the case B until the desired result is achieved, during which circulation the fibers are subjected necessarily to above-described treatment by the beaters as the latter pass over the ribbed surface of the case B, or of the rotor, according as one construction or the other is followed. The successive continuously repeated treatment of the wet fibers gradually reduces them and also renders them more absorptive or more ready to absorb the moisture and become hydrated than does any grinding, tearing or rubbing action.

By this process I obtain much better hydration of the pulp and in a much shorter time than by the older methods of pulping and I also obtain a stronger paper.

What I claim as my invention and desire to protect by Letters Patent is:—

The hereindescribed method of preparing previously ground paper pulp which consists in imparting a circulatory movement to the pulp and repeatedly subjecting the fibers during such circulation to a mechanical treatment comprising a continuously repeated combined vibratory tapping or hammering and a rubbing or dragging action.

In testimony whereof I have hereunto set my hand in presence of two subscribing witnesses.

HAROLD JACKSON.

Witnesses:
I. OWDEN O'BRIEN,
HARRY BARNFATHER.